United States Patent [19]

Lawton

[11] 4,135,033

[45] Jan. 16, 1979

[54] HEAT-ACTIVATED ADHESIVE COATING

[76] Inventor: William R. Lawton, 6651 Jewett-Holmwood Rd., Orchard Park, N.Y. 14127

[21] Appl. No.: 769,385

[22] Filed: Feb. 16, 1977

[51] Int. Cl.² .................. B32B 15/00; C09J 7/02
[52] U.S. Cl. .................. 428/344; 428/346; 428/351; 428/352; 428/355; 428/409; 428/435; 428/441; 428/442; 428/461; 428/458; 428/463; 428/512; 428/513; 428/514; 428/515; 428/516; 428/517; 428/518; 428/519; 428/520; 156/327; 106/285; 427/207 A; 427/333
[58] Field of Search .................. 260/31.2 R; 427/333; 156/327; 428/344, 346, 351, 458, 409, 352, 354, 355, 441, 442, 463, 461, 435, 512–520

[56] References Cited

U.S. PATENT DOCUMENTS

| | | | |
|---|---|---|---|
| 2,462,029 | 2/1949 | Perry | 156/327 |
| 3,104,979 | 9/1963 | Lawton et al. | 260/31.2 R X |
| 3,190,788 | 6/1965 | Loos | 428/344 X |
| 3,351,515 | 11/1967 | Muttera, Jr. | 428/346 |

*Primary Examiner*—P. C. Ives
*Attorney, Agent, or Firm*—Kegan, Kegan & Berkman

[57] ABSTRACT

A two-layer adhesive coating having a dry, non-tacky surface convertible to a permanently adhesive surface by application of heat. A first co-reactant in an adhesive-containing base layer combines with a second co-reactant applied to the base layer to form a dry, non-tacky barrier layer comprising a molecular complex which dissociates upon heating to form a permanently adhesive surface.

17 Claims, No Drawings

HEAT-ACTIVATED ADHESIVE COATING

BACKGROUND OF THE INVENTION

This invention relates to an adhesive coating which has a dry, tack-free surface convertible to a permanently pressure-sensitive adhesive layer by the application of heat. The invention is useful for labeling, sealing, adhesive layer transfer, decalcomania, and other packaging applications.

Non-tacky coated products which can be converted by heat to a tacky adhesive product have been described in prior art. Perry in U.S. Pat. No. 2,462,029 describes adhesive compositions containing discrete solid particles of a plasticizer dispersed in a potentially adhesive film. Heating the film activates the adhesive by causing the plasticizer to melt and merge with the polymeric components of the film. This results in an adhesive product which will retain its tack over an extended period of time. Typically this merging of the plasticizer and polymeric material results in increased tack or viscidity, and also lowers the temperature at which the composition solidifies to a dry, non-tacky film and conversely, at which temperature such dry film, after solidification, softens or activates upon a subsequent heating. The compositions of Perry have proved to be extremely useful in providing adhesive films and articles having such films, for example tapes and labels, which are dry and non-tacky at normal room and storage temperature conditions, but are heat activatable to adhesive tackiness and retain such adhesive tackiness when subsequently cooled to temperatures below their initial activation temperature. After initial activation, these films can be allowed to cool to temperatures appreciably below the activation temperature and can subsequently be applied to the desired surface. Heat need not, therefore, be maintained after the initial activation to keep the adhesive ready for use. Compositions of the Perry invention are limited to the use of solid crystalline plasticizers which due to their solid nature prior to initial activation remain inert within the composition.

Lawton et al. U.S. Pat. No. 3,104,979 describes an improvement over the Perry composition wherein liquid plasticizers are used in the place of the solid plasticizers of Perry. These liquid plasticizers are incorporated as solid inclusion compounds with urea. Heat forces the liquid plasticizer from the channels in the solid urea crystal and this liqiud plasticizer merges with the thermoplastic polymeric components of the film. The potentially adhesive film is dry and non-tacky when the plasticizer is in the included state and becomes tacky when the plasticizer is released from urea.

Both systems have a disadvantage in that both systems will detackify on cooling or ageing. The Perry plasticizers recrystallize and the Lawton plasticizers will recomplex with urea. There have been reports of numerous examples of the Perry type labels falling off the substrates during cold winter conditions. The adhesion of these systems is restricted to a limited number of substrates primarily due to lack of flexibility in adhesive formulations.

BRIEF DESCRIPTION OF THE INVENTION

It has been discovered that a thin, dry, non-tacky barrier coating can be formed on and in the surface layer of any conventional pressure-sensitive coating by a simple procedure. The barrier properties of this coating can be destroyed by heat to restore the original properties of the pressure-sensitive adhesive layer. Thus, the wide choice of performance characteristics of conventional pressure-sensitive adhesive products can be obtained from a dry, tack-free heat activatable composition.

The barrier layer is obtained by in situ formation of molecular complexes or compounds within and/or on the surface portion of the adhesive composition. Molecular compounds are not new in themselves, but are generally described by P. Pfeiffer, Organische Molekularverbindungen (Ferdinand Enke, Stuttgart, 1927) and by F. Cramer, Einschlussverbindungen (Springer-Verlag, Berlin 1954). Molecular compounds have the unique property of being dissociable by heat to yield the original components from which such molecular compounds were prepared.

The barrier coat can be easily formed by several methods. The complex barrier can be obtained by wash-coating a conventional adhesive composition containing one component of a molecular compound with a solution of the co-reactant or other component of the molecular compound. The two components of the complex then react in or on the surface portion of the adhesive to give a dry, tack-free barrier coating of the molecular compound or complex. The wash-coat can be a simple solution of the co-reactant or can also contain other materials such as polymers, UV absorbers, and the like. This barrier coat is only a minor part of the adhesive layer and heat dissociation of the molecular compounds causes volatilization and/or migration of the components through the bulk of the adhesive layer resulting in the generation of the original properties of the adhesive. Since the molecular compounds make up only a small portion of the total composition, future recombination of the components in the bulk layer have little if any effect on the properties of the adhesive. Either component may be used in the wash coat and the choice is at the convenience of the processsor.

Rather than use a wash-coat solution of the co-reactant to form the complex barrier layer the co-reactant may be in the form of a vapor or gas in contact with the adhesive layer or may be a simple frangible coating on another substrate wherein the complex barrier layer is formed by bringing the adhesive and co-reactant coatings in contact.

Two classes of molecular complexes have been found to be particularly useful in this invention.

The hydrogen bond complexing of hydroxyaromatic compounds with amines has provided an effective method for obtaining the complex barrier coat. Compositions which give solid complexes are readily obtained by reacting stoichiometric amounts of the compounds in methanol. The solid complex will separate and after filtering and drying, the dissociation temperature can be determined. The dissociation temperature of the complex relates to the activation temperature of the adhesive. It has been found that the dissociation temperatures can be lowered by including additives which cause a combined heat-solvent effect for dissociation of the complex. The following table lists some of the molecular complexes along with the co-reactants and dissociation temperatures.

TABLE I

AROMATIC HYDROXY COMPLEXES

| Phenol | Amine | Dissociation Temp.° C |
|---|---|---|
| p,p' biphenol | ethylene diamine | 136–140 |
| " | t.butyl aminoethyl methacrylate | |
| Bisphenol B | ethylenediamine | 85–92 |
| " | formamide | 64–66 |
| " | t.butyl aminoethyl methacrylate | 94–6 |
| 4,4'-isopropylidene bis (2-isopropylphenol) | triethanolamine | 60–63 |
| " | ethylene diamine | 100–4 |
| 4,4'-isopropylidene bis (2,6-dibromophenol) | diethanol amine | 107–145 |
| " | triethanolamine | 128–157 |
| " | ethylene diamine | 198–215 |
| " | diethylenetriamine | 210–215 |
| " | propylene diamine | 146–156 |
| " | formamide | 95–102 |
| " | hydrazine | 135–150 |
| " | t.-butyl aminoethyl methacrylate | 130–5 |
| 4-hydroxy propiophenone | hydrazine | 84–90 |
| 2,4-dichloro-6-phenylphenol | ethylenediamine | 100–4 |
| " | diethylenetriamine | 115–20 |
| " | propylenediamine | 92–4 |
| 2,2'-methylenebis (3,4,6-trichlorophenol) (Hexachlorophene) | diethanolamine | 75–8 |
| " | triethanolamine | 118–23 |
| 41 | ethylenediamine | 124–7 |
| " | diethylenetriamine | 90–110 |
| " | propylene diamine | 125–30 |
| " | foramide | 125–30 |
| " | hydrazine | 180–4 |
| " | t-butylamine ethyl methacrylate | 123–6 |
| 2-bromo-4-phenyl phenol | ethylenediamine | 66–8 |
| " | diethylene triamine | 78–82 |
| " | formamide | 55–8 |
| p-phenyl phenol | ethylene diamine | 137–43 |
| " | diethylene triamine | 99–104 |
| " | propylene diamine | 77–81 |
| " | formamide | 90–5 |
| " | hydrazine | 145–150 |
| 2,2'-thiobis (4,6-dichlorophenol) (Actomer) | triethanolamine | 120–5 |
| " | ethylene diamine | 125–130 |
| " | diethylene triamine | 158–164 |
| " | propylene diamine | 142–5 |
| " | formamide | 115–25 |
| " | hydrazine | 195–200 |
| 4,4' isopropylidenebis (2,6-dichlorophenol) (Tetrachlorobisphenol A) | ethylenediamine | 192–5 |
| " | diethylene triamine | 210–15 |
| " | propylene diamine | 170–5 |
| " | formamide | 100–5 |
| " | hydrazine | 142–6 |
| " | t-butyl amine ethyl methacrylate | 132–5 |
| 5-chloro-2-hydroxy benzophenone | ethylene diamine | 190–4 |
| o-phenylphenol (Dowicide 1) | ethylene diamine | 55–60 |
| " | formamide | 50–3 |
| " | hydrazine | 60–4 |
| Dichlorophene | formamide | 90–3 |
| 2,2'-methylenebis (4-ethyl-6-t.butylphenol) (Antioxidant 425) | triethanolamine | 68–70 |
| Bisphenol A | ethylene diamine | 100–4 |
| " | propylene diamine | 94–100 |
| " | t-butylamine ethyl methacrylate | 90–2 |
| 4,4'-thiobis (6-t. butyl-m-cresol) (Santowhite crystals) | triethanolamine | 95–8 |
| " | ethylene diamine | 106–11 |
| " | propylene diamine | 125–35 |
| " | t. butylamine ethyl methacrylate | 62–5 |
| 4,4'-butylidenebis (6-t. butyl-m-cresol) (Santowhite Powder) | triethanolamine | 68–70 |
| 2,2'-methylenebis (4-methyl-6-t.butylphenol (Antioxidant 2246) | diethanolamine | 62–5 |
| " | ethylene diamine | 54–8 |
| p-cyclohexyl phenol | triethanolamine | 35–40 |
| " | ethylene diamine | 125–30 |
| " | diethylene triamine | 70–85 |

TABLE I-continued

AROMATIC HYDROXY COMPLEXES

| Phenol | Amine | Dissociation Temp. °C |
|---|---|---|
| " | propylene diamine | 88–90 |
| o-cyclohexyl phenol | ethylene diamine | 88–93 |
| " | hydrazine | 75–80 |
| p-t.butyl phenol | ethylene diamine | 70–3 |
| " | propylene diamine | 54–7 |
| p.-sec. butyl phenol | ethylene diamine | 50–4 |
| p-bromophenol | formamide | 35–8 |
| 2,4,6-tribromophenol | ethylenediamine | 135–8 |
| " | propylenediamine | 85–9 |
| " | formamide | 90–3 |
| pentachlorophenol | diethanolamine | 145–55 |
| " | triethanolamine | 133–7 |
| " | ethylenediamine | 115–20 |
| " | diethylenetriamine | 185–90 |
| " | propylene diamine | 168–72 |
| " | formamide | 100–5 |
| " | hydrazine | 200–5 |
| " | t-butyl amine ethyl methacrylate | 115–20 |
| 2,6-dichlorophenoll | triethanolamine | 83–6 |
| " | ethylene diamine | 110–15 |
| " | propylenediamine | 100–155 |
| " | formamide | 40–5 |
| " | hydrazine | 115–20 |
| " | t.butyl amine ethyl methacrylate | 100–5 |
| 2-chloro-4-phenyl phenol | ethylene diamine | 130–5 |
| " | propylene diamine | 50–4 |
| " | hydrazine | 108–12 |
| tetrachlorophenol (Dowicide 6) | diethanolamine | 110–25 |
| " | triethanolamine | 98–104 |
| " | ethylene diamine | 192–5 |
| " | propylene diamine | 165–70 |
| " | formamide | 85–90 |
| " | hydrazine | 163–5 |
| " | t.-butyl amino ethyl methacrylate | 95–100 |
| 2,4,6-trichlorophenol | ethylene diamine | 105–14 |
| " | propylene diamine | 100–5 |
| " | formamide | 85–90 |
| " | hydrazine | 150–7 |
| " | t.-butyl amine ethyl methacrylate | 70–5 |
| β-β-ethylenediimino-o-cresol | formamide | 105–10 |
| " | t.butylamine ethyl-methacrylate | 118–12 |
| Bisphenol A | benzylamine | 70–4 |
| 4,4'-isopropylidenebis (2,6-dibromophenol) (Tetrabromobisphenol A) | 2-amino-1-butanol | 155–62 |
| " | aminoethylenethanolamine | 74–85 |
| " | 2-amino-2-ethyl-1,3-propenediol | 130–40 |
| " | 2-amino-2-methyl-1,3-propenediol | 154–60 |
| " | aminoethyl piperazine | 140–50 |
| " | 2-amino-2-methyl-1-propanol | 180–90 |
| " | 2-amino-1-phenyl-1-propanol | 100–30 |
| " | 3-amino propanol | 190–5 |
| " | benzylamine | 144–8 |
| " | chloroacetamide | 114–22 |
| " | 3-chloro-N-methyl-acetamide | 80–5 |
| Tetrabromobisphenol A | n-decylamine | 170–90 |
| " | 1,3-diamino propane | 218–225 |
| " | 3-di-n-butyl amino propylamine | 150–8 |
| " | diethanolamine | 140–3 |
| " | diethylamino ethoxy ethanol | 180–5 |
| " | diethylamino propylamine | 175–85 |
| " | N-diethyl amino propyl-1-methyloctadecylamine | 88–100 |
| " | diethylisopropanolamine | 135–42 |
| " | diisopropanolamine | 65–75 |
| " | diisopropylethanolamine | 158–165 |
| " | dimethylacetamine | 95–100 |
| " | dimethylamino propylamine | 198–202 |
| " | dimethylethanolamine | 135–45 |
| " | dimethylformamide | 60–5 |
| " | N-(1,1-dimethyl-2-hydroxy ethyl)-2-methyl 1-1, 2 Propane diamine | 130–40 |
| Tetrabromobisphenol A | t.-dodecylaminopro-pylamine | 90–105 |
| " | ethanolamine | 170–80 |
| " | N-ethylethanolamine | 90–100 |
| " | N- | 137–42 |
| " | hexamethyl phosphoramide | 127–30 |
| " | n-hexylamine | 200–10 |

TABLE I-continued
AROMATIC HYDROXY COMPLEXES

| Phenol | Amine | Dissociation Temp.° C |
|---|---|---|
| " | hydroxyethyl diethylene triamine | 60–80 |
| " | N-2-hydroxyethyl-1-methyl dodecylamine | 100–110 |
| " | N-hydroxyethyl piperazine | 190–200 |
| " | hydroxy ethyl trihydroxy propyl-ethylene diamine | 45–55 |
| " | iminobispropylamine | 210–20 |
| " | isobutylamine | 160–70 |
| " | isopropylamine | 165–75 |
| " | 3-isopropoxypropanolamine | 165–75 |
| " | isopropylamine | 160–70 |
| " | methanediamine | 140–5 |
| " | methyldiethanolamine | 132–6 |
| " | methyl ethanol amine | 143–6 |
| " | N-methyl-bis-amino propylamine | 210–20 |
| " | polyglycol amine H-119 | 115–20 |
| " | polyglycolamine H-176 | 195–205 |
| " | polyglycolamine H-221 | 165–174 |
| " | 1,2-propanediamine | 150–160 |
| " | propylenediamine | 148–155 |
| " | tetramethylethylenediamine | 190–200 |
| " | tetramethylguanidine | 225–235 |
| " | triethanolamine | 154–8 |
| " | triethylene tetramine | 200–15 |
| " | triisopropanolamine | 135–9 |
| p,p'-biphenol | hexamethyl phosphoramide | 40–50 |
| 4-hydroxy propiophenone | hydrazine | 84–90 |
| 2,2'-methylene bis (2,4,6-trichlorophenol) | aminoethylethanolamine | 165–7 |
| " | 2-amino-2-ethyl-1,3-propanediol | 151–70 |
| " | 2-amino-2-methyl-1,3-propanediol | 182–4 |
| " | benzylamine | 210–16 |
| " | t-butylaminoethyl methacrylate | 123–6 |
| " | diethanolamine | 74–8 |
| " | diethylenetriamine | 90–110 |
| 2,2'-methylene bis (2,4,6-trichlorophenol) | dimethylethanolamine | 183–93 |
| " | N-ethyldiethanolamine | 124–7 |
| " | ethylene diamine | 187–92 |
| " | formamide | 125–30 |
| " | hexamethyl prosphoramide | 85–90 |
| " | hydrazine | 180–4 |
| " | N-methylbisamino propylamine | 157–65 |
| " | methyldiethanolamine | 154–7 |
| 2,2'-methylene bis (2,4,6-trichlorophenol) | methylethanolamine | 193–200 |
| " | polyglycolamine H-176 | 208–24 |
| " | propylenediamine | 135–40 |
| " | triethanolamine | 142–6 |
| 2,4-dichloro-6-phenyl phenol | diethylene triamine | 115–20 |
| " | ethylene diamine | 100–4 |
| " | propylenediamine | 92–4 |
| 2-bromo-4-phenyl phenol | benzylamine | 85–95 |
| " | diethylenetriamine | 78–82 |
| " | ethylenediamine | 66–8 |
| " | formamide | 55–8 |
| " | hydrazine | 82–8 |
| p-phenyl phenol | benzylamine | 70 |
| " | diethlenetriamine | 99–104 |
| " | ethylenediamine | 137–43 |
| " | formamide | 113–5 |
| " | hexamethyl phosphoramide | 34–5 |
| " | hydrazine | 155–8 |
| " | propylene diamine | 71–81 |
| " | triethylene tetramine | 63–5 |
| 2,2'-thiobis (4,6-dichlorophenol) | 2-amino-2-ethyl-1,3-propanediol | 125–59 |
| " | benzylamine | 197–9 |
| " | diethanolamine | 143–7 |
| " | diethylene triamine | 158–74 |
| " | diisopropanolamine | 155–62 |
| " | dimethylacetamide | 190–3 |
| " | dimethylethanol amine | 120–3 |
| " | N-ethydiethanolamine | 127–30 |
| " | ethylene diamine | 125–30 |
| " | hydrazine | 195–200 |
| " | iminobispropylamine | 50–74 |
| " | methyldiethanolamine | 127–40 |
| " | polyglycolamine H-176 | 210–14 |
| " | propylene diamine | 142–5 |
| " | formamide | 115–25 |
| " | triethanolamine | 165–8 |
| " | triisopropanolamine | 151–5 |

TABLE I-continued
AROMATIC HYDROXY COMPLEXES

| Phenol | Amine | Dissociation Temp.° C |
|---|---|---|
| 2,2' methylene bis (4-chlorophenol) | benzylamine | 60–100 |
| " | formamide | 90–3 |
| 4,4'-isopropylidene bis (2,6-dichlorophenol) | 2-amino-1-butanol | 166–70 |
| " | aminoethylethanolamine | 154–8 |
| " | 2-amino-2-ethyl-1,2-propanediol | 166–8 |
| " | 2-amino-2-methyl-1,3-propanediol | 172–5 |
| " | 3-amino propanol | 180–90 |
| " | amylamine | 200–10 |
| " | aniline | 90–6 |
| " | benzylamine | 145–55 |
| 4,4'-isopropylidene bis (2,6-dichlorophenol) | t.butylaminoethyl methacrylate | 132–5 |
| " | cyclohexylamine | 190–204 |
| " | n-decylamine | 193–8 |
| " | 1,3-diamino propane | 230–5 |
| " | dibutylamine | 124–57 |
| " | 3-di-n-butylamine propylamine | 155–64 |
| " | dibutylmethylamine | 120–31 |
| " | dicyclohexylamine | 202–6 |
| " | diethanolamine | 150–3 |
| " | diethylamine | 142–7 |
| " | diethylaminoethyl methacrylate | 115–7 |
| " | β-diethylaminopropionitrile | 94–6 |
| " | 3-ethylamino propionitrile | 103–5 |
| " | di-2-ethylhexylamine | 100–5 |
| " | diethylene triamine | 210–15 |
| " | diethylisopropanolamine | 125–35 |
| " | diisopropylethanolamine | 162–4 |
| " | diisopropylamine | 141–52 |
| " | β-dimethylamino propionitrile | 70–3 |
| " | dimethylaminopropylamine | 197–203 |
| " | dimethylethanolamine | 140–6 |
| " | di-n-propylamine | 142–53 |
| " | 3-t.-dodecylaminopropylamine | 100–5 |
| " | ethanolamine | 96–104 |
| " | N-ethylcyclohexylamine | 161–78 |
| " | N-ethyldiethanolamine | 154–5 |
| " | ethylene diamine | 208–10 |
| " | N-ethylethanolamine | 87–110 |
| " | formamide | 103–8 |
| " | hexamethylphosphoramide | 122–4 |
| " | n-hexylamine | 168–85 |
| " | hydrazine | 142–6 |
| " | hydroxyethylethylene diamine | 94–100 |
| " | iminobispropylamine | 220–3 |
| " | isobutylamine | 152–67 |
| " | isodecylamine | 187–95 |
| " | isooctylamine | 172–84 |
| " | isopropanolamine | 150–7 |
| " | 3-isopropoxyisopropanolamine | 160–7 |
| " | β-isopropylaminopropionitrile | 103–7 |
| " | 3-isopropylamine propylamine | 122–7 |
| " | isoquinoline | 102–4 |
| " | 2,6-lutidine | 125–32 |
| " | methanediamine | 186–90 |
| " | N-methyl bis amino propylamine | 219–36 |
| 4,4'-isopropylidene bis (2,6-dichlorophenol) | methylaminopropylamine | 207–13 |
| " | methylbenzylamine | 145–55 |
| " | N-methyldiethanolamine | 148–52 |
| " | N-methylethanolamine | 85–102 |
| " | 3,3'-methyl iminobis propylamine | 190–9 |
| " | N-methyl morpholine | 120–4 |
| " | N-methyl-2-pyrrolidone | 70–3 |
| " | morpholine | 159–60 |
| " | phenyldiethanolamine | 85–95 |
| " | phenylethanolamine | 88–95 |
| " | 2,2'-phenyliminodiethanolamine | 55–70 |
| " | γ-picoline | 96–9 |
| " | polyglycolamine H-119 | 156–63 |
| " | polyglycolamine H-169 | 123–33 |
| " | polyglycolamine H-176 | 210–18 |
| " | polyglycolamine H-221 | 196–200 |

TABLE I-continued
AROMATIC HYDROXY COMPLEXES

| Phenol | Amine | Dissociation Temp. °C |
|---|---|---|
| " | propylenediamine | 168–75 |
| " | pyridine | 117–30 |
| " | tetraethylene pentamine | 92–102 |
| " | tributylamine | 103–8 |
| " | triethylamine | 155–64 |
| " | triethanolamine | 139–45 |
| " | triethylene tetramine | 215–20 |
| " | triisopropanolamine | 125–30 |
| " | trimethylenediamine | 230–5 |
| " | dimethylacetamide | 132 |
| 5-chloro-2-hydroxy benzophenone | ethylenediamine | 190–4 |
| 2,2'-methylene bis (4-ethyl 6-dibutyl phenol) | benzylamine | 76–85 |
| " | triethanolamine | 68–70 |
| o-phenyl phenol | ethylenediamine | 55–60 |
| " | formamide | 50–3 |
| " | hydrazine | 60–4 |
| 4,4'-isopropylidene bisphenol | benzylamine | 80–90 |
| " | t-butylaminoethyl-methacrylate | 90–2 |
| " | cyclohexylamine | 108–10 |
| " | dibutylamine | 120–52 |
| " | diethylamine | 117–53 |
| " | dimethylamine propylamine | 105–8 |
| " | di-n-propylamine | 90–100 |
| " | ethylenediamine | 100–4 |
| " | formamide | 66–8 |
| " | isobutylamine | 88–93 |
| " | methanediamine | 128–30 |
| " | N-methyliminobis-propylamine | 94–8 |
| " | propylenediamine | 95–100 |
| " | triethylenetetramine | 137–9 |
| 4,4'-thiobis (6-t.butyl-m-cresol) | t.butylamino ethyl methacrylate | 62.5 |
| " | cyclohexylamine | 78–85 |
| " | ethylenediamine | 112–15 |
| " | iminobispropylamine | 85–95 |
| " | isopropylamine | 164–6 |
| " | propylenediamine | 130–6 |
| " | pyridine | 160–5 |
| " | triethanolamine | 95–8 |
| 4,4'-butylidene bis (m-cresol) | acetamine | 82–3 |
| " | benzylamine | 135 |
| " | cyclohexylamine | 214–7 |
| " | ethylenediamine | 213–7 |
| " | triethanolamine | 68–70 |
| 2,2'-methylene bis (4-methyl-6-t.butylphenol) | 2-amino-1-butanol | 58–64 |
| " | benzylamine | 69–79 |
| " | decylamine | 52–3 |
| " | 1,3-diaminopropane | 50–5 |
| " | N-dibutylethylamine | 60–5 |
| " | diethanolamine | 62–5 |
| " | di-n-hexylamine | 81–9 |
| " | ethyl cyclohexylamine | 92–4 |
| " | N-ethyl diethanolamine | 68–71 |
| " | isopropylaminoiso-propylamine | 128–32 |
| " | ethylene diamine | 54–8 |
| " | hexamethyl phosphoramide | 58–65 |
| " | isoquinoline | 121–5 |
| " | N-methyldiethanolamine | 127–34 |
| " | methyl ethanolamine | 74–84 |
| " | triamylamine | 65–75 |
| " | triethanolamine | 61–5 |
| " | triethanolamine | 61–5 |
| p-cyclohexyl phenol | triethanolamine | 35–40 |
| " | benzylamine | 50–5 |
| " | diethylenetriamine | 70–85 |
| " | ethylene diamine | 125–30 |
| " | hexamethyl phosphoramide | 97–109 |
| " | hydrazine | 115–20 |
| " | propylene diamine | 88–90 |
| o-cyclohexyl phenol | benzylamine | 82–95 |
| " | ethylene diamine | 88–93 |
| " | hydrazine | 75–80 |
| p.t.-butyl phenol | benzylamine | 70–80 |
| " | ethylenediamine | 70–3 |
| " | hydrazine | 45–50 |
| " | propylenediamine | 54–6 |
| p-bromophenol | formamide | 35–8 |
| 2,4-dibromophenol | benzylamine | 80–5 |
| 2,4,6-tribromophenol | t.butyl amino ethyl methacrylate | 68–71 |
| " | benzylamine | 125–30 |

TABLE I-continued

AROMATIC HYDROXY COMPLEXES

| Phenol | Amine | Dissociation Temp.° C |
|---|---|---|
| " | ethylene diamine | 135-8 |
| " | formamide | 90-3 |
| " | hydrazine | 145-54 |
| " | propylene diamine | 87-92 |
| Pentachlorophenol | benzylamine | 155-60 |
| " | t.-butylaminoethyl methacrylate | 115-20 |
| " | diethanolamine | 145-55 |
| " | diethylenetriamine | 185-90 |
| " | ethylenediamine | 115-20 |
| " | formamide | 100-105 |
| " | hexamethyl phosphoramide | 79-83 |
| " | hydrazine | 200-205 |
| " | propylenediamine | 168-72 |
| " | triethanolamine | 133-7 |
| 2,6-dichlorophenol | benzylamine | 100-5 |
| " | t.butylaminoethyl methacrylate | 100-5 |
| " | diethanolamine | 83-6 |
| " | ethylenediamine | 110-15 |
| " | formamide | 40-5 |
| " | hydrazine | 115-20 |
| " | propylenediamine | 115-25 |
| 2-chloro-4-phenyl phenol | benzylamine | 95-100 |
| " | ethylenediamine | 130-5 |
| " | hydrazine | 108-12 |
| " | propylenediamine | 50-4 |
| tetrachlorophenol | benzylamine | 115-25 |
| " | t.butylaminoethyl methacrylate | 95-100 |
| " | diethanolamine | 110-25 |
| " | ethylenediamine | 192-5 |
| " | formamide | 85-90 |
| " | hydrazine | 163-5 |
| " | propylenediamine | 165-70 |
| " | triethanolamine | 98-104 |
| 2,4,6-trichlorophenol | benzylamine | 120-5 |
| " | t.butylaminoethyl methacrylate | 70-5 |
| " | ethylenediamine | 105-14 |
| " | formamide | 85-90 |
| " | hydrazine | 150-7 |
| " | propylenediamine | 100-5 |
| 2,4-chloro-1-naphthol | benzylamine | 55-60 |
| " | diethanolamine | 65-70 |
| " | diethylenetriamine | 79-83 |
| " | formamide | 78-82 |
| " | hydrazine | 83-93 |
| " | triethanolamine | 63-5 |
| 2-naphthol | benzylamine | 40-5 |
| " | ethylenediamine | 86-9 |
| " | formamide | 56-59 |
| " | hydrazine | 110-12 |
| 4,4-isopropylidene bis (p-chlorophenol) | benzylamine | 105-10 |
| " | formamide | 55-60 |
| " | hexamethyl phosphoramide | 46-8 |
| " | hydrazine | 100-112 |
| 2,6-dibromo-t.butyl phenol | benzylamine | 75-80 |
| " | diethylenetriamine | 85-96 |
| " | ethylenediamine | 95-105 |
| " | hydrazine | 105-110 |
| " | propylenediamine | 95-100 |
| " | triethanolamine | 104-6 |
| p-phenoxy phenol | ethylenediamine | 56-62 |
| " | hydrazine | 48-56 |
| 2,4,5-trichlorophenol | benzeylamine | 118-20 |
| " | t.butylaminoethyl methacrylate | 55-60 |
| " | diethanolamine | 105-10 |
| " | diethylenetriamine | 85-95 |
| " | ethylenediamine | 55-60 |
| " | hydrazine | 94-100 |
| " | propylenediamine | 96-104 |
| 1,1-di (4-hydroxyphenyl) cyclohexane | diethanolamine | 100-112 |
| " | propylenediamine | 120-5 |
| 1,1-di (3,5-dibromo-4-hydroxy phenyl) cyclohexane | diethanolamine | 149-54 |
| " | propylenediamine | 175-80 |
| 3,3-bis (3,5-dibromo-4-hydroxy phenyl) pentane | propylenediamine | 183-92 |
| 2,2-bis (3,5-dibromo-4-hydroxy phenyl) pentane | diethanolamine | 110-18 |
| " | propylenediamine | 180-90 |
| bis (3,5-dibromo-4-hydroxy phenyl) methane | diethanolamine | 115-23 |
| 2,2-bis (3,5-dibromo-4-hydroxy phenyl) butane | diethanolamine | 142-5 |
| " | propylenediamine | 174-6 |

TABLE I-continued
AROMATIC HYDROXY COMPLEXES

| Phenol | Amine | Dissociation Temp. °C |
|---|---|---|
| 3,3'-5,5'-tetrabromo-4,4'-dihydroxy biphenyl | diethanolamine | 173–80 |
| " | propylene diamine | 180–2 |
| 1-phenyl-1, 1-di (3,5-dibromo-4-hydroxy phenyl) ethane | diethanolamine | 145–50 |
| " | propylenediamine | 185–200 |
| 2,2-di (3,5-dibromo-4-hydroxyphenyl) 4-methyl-penetane | diethanolamine | 115–20 |
| " | propylenediamine | 190–4 |
| 2,2-di (3,5 dibromo-4-hydroxy phenyl) heptane | diethanolamine | 145–50 |
| " | propylenediamine | 195–7 |
| 1,1-di (3,5-dibromo-4-hydroxy phenyl) butane | diethanolamine | 100–15 |
| " | propylene diamine | 173–7 |
| 2,2-di (3,5-dibromo-4-hydroxy phenyl) octane | diethanolamine | 140–2 |
| 1,1-di (3,5-dibromo-4-hydroxy phenyl) ethane | diethanolamine | 105–10 |
| | propylenediamine | 175–8 |
| 2,4-dihydroxybenzophenone | propylenediamine | 212–18 |
| 3,5-dichlorosalicylaldehyde | diethanolamine | 100–5 |
| " | hexamethyl phosphoramide | 70–84 |
| " | propylenediamine | 135–45 |
| bisphenol A disalicylate | diethanolamine | 150–5 |
| " | propylenediamine | 155–75 |
| tetrachlorohydroquinone | diethanolamine | 146–50 |
| " | propylene diamine | 175–80 |
| 2-hydroxy-5-phenyl-propiophenone | propylenediamine | 180–5 |
| 2,4,6-tribenzoyl resorcinol | diethanolamine | 125–30 |
| | propylenediamine | over 280 |
| 3,5-dibromosalicylaldehyde | diethanolamine | 90–8 |
| " | hexamethylphosphoramide | 83–95 |
| " | propylenediamine | 150–2 |
| 2-isopropyl-4,6-dinitrophenol | diethanolamine | 105–10 |
| " | propylenediamine | 188–90 |
| 3,4,6-trichloro-2-nitro phenol | diethanolamine | 146–50 |
| " | propylenediamine | 185–90 |
| 1,1-methylenebis-2-naphthol | diethanolamine | 135–40 |
| " | hexamethylphosphoramide | 142–4 |
| " | propylenediamine | 160–5 |
| 1,1-di-2-naphthol | diethanolamine | 158–74 |
| " | hexamethylphosphoramide | 112–20 |
| " | propylenediamine | 120–30 |
| 1,1-thio bis (2-naphthol) | diethanolamine | 135–42 |
| " | hexamethyl phosphoramide | 124–8 |
| " | propylenediamine | 120–5 |
| p-chlorotrisphenol | diethylene triamine | 132–8 |
| " | hexamethylphosphoramide | 149–51 |
| 1,1-bis (3,5-dichloro-4-hydroxyphenyl) cyclohexane | benzylamine | 144–52 |
| 1,1-bis (3-5-dichloro-4-hydroxy phenyl) cyclohexane | diethanolamine | 140–3 |
| " | diisopropyl ethanolamine | 164–8 |
| " | dimethyl ethanolamine | 169–85 |
| " | methyl diethanolamine | 131–9 |
| " | methyl ethanolamine | 165–71 |
| " | polyglycolamine H-176 | 192–200 |
| pentabromophenol | aminoethylethanolamine | 131–3 |
| " | 2-amino-2-methyl-1,3-propanediol | 170–9 |
| " | benzylamine | 155–8 |
| " | diethanolamine | 158–61 |
| " | diisopropanolamine | 178–37 |
| " | diisopropylethanolamine | 130–3 |
| " | N-ethyldiethanolamine | 93–8 |
| " | methyl diethanolamine | 120–3 |
| " | methyl ethanolamine | 163–5 |
| " | triethanolamine | 129–34 |
| hydroquinone | acetamide | 99–105 |
| " | formamide | 63–5 |
| " | morpholine | 64–8 |
| " | piperazine | 187–95 |
| resorcinol | hydrazine | 48–55 |
| " | piperazine | 147–52 |
| pyrogallol | formamide | 55–8 |
| " | acetamide | 58–65 |

The inclusion of long-chain (8 or more carbons in the chain) hydrocarbon derivatives in urea is another effective means for obtaining the barrier coat. Certain additives will decompose the urea complex at lower than normal activation temperatures for urea inclusion compounds. Some compounds which are readily complexed by urea are:
Long chain normal aliphatic hydrocarbons
Long chain normal aliphatic alcohols Long chain normal aliphatic fatty acids
Long chain normal aliphatic fatty amides
Long chain normal aliphatic paraffin amines
Long chain normal aliphatic fatty acid esters
Long chain normal aliphatic fatty nitriles
Long chain normal aliphatic ketones
Long chain normal aliphatic ethers
Long chain normal aliphatic halides
Long chain normal aliphatic aldehydes
Long chain normal aliphatic nitro compounds
Long chain normal aliphatic sulfides
Long chain normal aliphatic mercaptans
Long chain normal unbranched olefins Similar results may be obtained by substituting thiourea for urea and using branch-chained hydrocarbon derivatives in place of the normal or straight chained derivatives listed above.

The versatility of the invention also allows the use of hot-melt, water, or solvent base compositions for the adhesive coating.

PREFERRED EMBODIMENT OF THE INVENTION

1. An adhesive composition (commercial or experimental) is chosen to give the final adhesive characteristics desired in the finished product. These compositions are readily developed by those who are skilled in the formulation of pressuresensitive adhesives.

2. One of the co-reactants (either the amine or the aromatic hydroxy compound for hydrogen bonded complexes or either the hydrocarbon derivative or urea for the inclusion complex) is dissolved in the adhesive composition and the total adhesive formulation is coated onto the desired substrate at a coating thickness normal for pressure-sensitive adhesives and allowed to dry.

3. The co-reactant necessary to form the molecular complex is dissolved in a volatile medium which acts as a solvent for both reactants but which does not dissolve the molecular complex. This solution is applied to the surface of the adhesive layer by wash-coating, spraying, dipping, or any other convenient method which will permit the co-reactants to come in contact. A thin layer of the molecular complex is formed at and in the surface of the adhesive coating which, when dry, acts as a non-tacky barrier masking the adhesive properties of the coating.

4. The original adhesive characteristics may be regenerated by heating to cause dissocation of the complex and migration of the components into the bulk or body of the adhesive layer.

Specific illustrations demonstrating the working of this invention are contained in the following examples.

| Water Base Adhesive Systems | |
|---|---|
| Adhesive Base | |
| Amsco 3036 polyethylhexylacrylate (52%) | 259.62 lb. |
| Carboxymethylcellulose (CMC 7L 10% in water) | 13.50 |
| Ammonia 28° Be | 6.75 |
| Methanol | 18.91 |
| Water | 31.97 |
| CMC 7L (10% in water) to adjust viscosity to 3000 cps. | |

| Hydrogen Bonded Molecular Complex Systems | |
|---|---|
| Hydroxyaromatic | Amine |
| 1. 4,4'-isopropylidenebis (2,6-dibromophenol) (Tetrabromobisphenol A) | Dibenzylamine |
| 2. Tetrabromobisphenol A | Hexamethyleneamine |
| 3. Hydroquinone | " |
| 4. Pyrogallol | " |

The adhesive coating is prepared by incorporating 4 parts of amine in 96 parts Adhesive Base, applying this mixture onto conventional base paper stock such as Kromekote with a 6 mil Bird applicator and allowing to dry at room temperature to give a conventional tacky pressure-sensitive adhesive.

A seven-percent solution of the hydroxyaromatic compound is prepared using methanol as the solvent and the adhesive coating is dipped into this solution to give a wash coat. Upon evaporation of the methanol, the surface of the adhesive layer is dry and essentially tack-free due to the in situ formation of the hydrogen bonded molecular complex between the amine and the aromatic hydroxy compoound.

When these non-tacky potentially adhesive coated papers are heated for 10 seconds on a hot arch at a temperature of about 135° to 143° C., adhesiveness is similar to the properties of the original adhesive coating without wash-coat treatment. The adhesive tack is still present two weeks after heat activation.

Addition of 4 parts-per-hundred parts of the adhesive formulation of a third co-reactant comprising any one of the following: benzil, hydroquinone-monomethylether, p-hydroxy-acetophenone, 4-methoxybenzil, t.butyl hydroquinone, 1,5-diphenylpentenedione, or dehydroacetic acid and wash-coating as previously described results in dry, tack-free coatings which can be activated to full adhesiveness by heating for 10 seconds at 110° C. Without the use of these additives, full adhesiveness is not obtained under the same activation conditions.

| Urea-Hydrocarbon Molecular Compound Systems |
|---|
| Hydrocarbon Derivative |
| 5. Ethomeen C-20 (long chain fatty amine) |
| 6. Lauric Acid |
| 7. Armid C (long chain fatty acid amide) |

The adhesive coating is prepared by dissolving 10 parts of urea in 100 parts of the previously described Adhesive Base. This coating mixture is applied with a 6 mil Bird applicator to a suitable substrate and allowed to air-dry.

The wash-coat is prepared by dissolving 15 parts hydrocarbon derivative in 85 parts methanol. This wash-out is applied in the manner described earlier and allowed to airdry 24 hours. The resulting product is a dry,tack-free potentially adhesive composition which can be activated to its adhesive state by heating 10 seconds at 177° C. The adhesive properties are still present 2 weeks after activation. If 8 parts of dehydroacetic acid or glycollic acid are added to 100 parts of the adhesive formulation, activation can be obtained by heating for 10 seconds at 138° C.

| Solvent Base Adhesives | |
|---|---|
| Adhesive I Composition | pounds |
| Ameripol 1011 | 233.8 |
| Foral-105 | 342.9 |
| Natsyn-400 | 22.86 |
| Versene | 5.97 |
| Wingstay L | 2.35 |
| Toluol | 1267.91 |
| Adhesive II (Dennison Mfg. Co. product sold under name of A-30) | |

| Hydrogen Bonded Molecular Complex Systems | | |
|---|---|---|
| Aromatic Hydroxy | Amine | Adhesive |
| 8. 4,4'-isopropylidenebis (2,6-dibromophenol) (Tetrabromobisphenol A) | dibenzylamine | I |
| 9. " | hexamethylene amine | I |
| 10. 4,4'-butylidenebis (6-t. butyl-m-cresol) (Santowhite Powder) | N-phenylbenzylamine | I |
| 11. " | hexamethylene amine | I |
| 12. " | N-phenylmorpholine | I |
| 13. Santowhite Powder | N-phenylnaphthylamine | I |
| 14. " | tribensylamine | I |
| 15. " | benzyldimethylamine | I |
| 16. " | phenyldiethanolamine | I |
| 17. Tetrabromobisphenol A | benzyldimethylamine | II |
| 18. 2,2'-methylenebis (3,4,6-trichlorophenol) (Hexachlorophene) | " | II |
| 19. Tetrabromobisphenol A | triIsopropanolamine | II |
| 20. Santowhite Powder | " | II |

The adhesive coating is made by incorporating 4 parts of amine into 100 parts adhesive and applying at a thickness of 6 mils wet to a conventional pressure-sensitive adhesive base paper. The resulting coating is air-dried and wash-coated with a 5-percent solution of the aromatic hydroxy compound. Air-drying results in a dry, tack-free barrier coat of the complex on the surface of the adhesive layer.

When these dry, non-tacky potentially adhesive products are activated for 10 seconds at 149° C., the original adhesive character of the adhesive coating is regenerated. The adhesive properties still persist 8 days after activation.

The activation temperatures of formulas 8, 10, 12, and 14 are lowered to 116° C. or below by incorporating any of the following additives into the adhesive formulation: 1,5-diphenyl-3-pentenedione, benzophenone, 2,3,4-trihydroxydecaphenone, 4,4'-dimethylbenzophenone, dehydroacetic acid, benzil, 4-methoxybenzil, ethyl-p-hydroxybenzoate, resorcinol monobenzoate, or p-bromoacetophenone.

| Urea-Hydrocarbon Systems |
|---|
| Hydrocarbon derivative |
| 21. Octanoic acid |
| 22. Oleic acid |
| 23. Armeen 2 HT (dihydrogenated tallow amine) |
| 24. Oleonitrile |
| 25. n-Octyl-n-decyladipate |

The adhesive coating is prepared by dissolving 10 parts of the hydrocarbon derivative in 100 parts Adhesive I. The mixture is then coated at a thickness of 6 mils (wet) onto conventional pressure-sensitive paper stock and air-dried. The tacky adhesive layer is then washed in the normal manner with a saturated solution of urea in methanol. The resulting tack-free air-dried coatings can be activated by heating for 10 seconds at 177° C. The activation temperature can be lowered to below 138° C. by using additives such as diglycollic acid or dehydroacetic acid to the adhesive layer or wash coat.

Products which can be used for adhesive transfer are obtained by coating with the previously described adhesive formulations (Ex.1 to 25) silicone treated release papers normally used to prevent sticking of the conventional pressure-sensitive adhesive products. These coatings are washed with solutions containing the co-reactants described above to give a dry, tack-free surface. The coated product is activated by heat as already described to give a pressure-sensitive adhesive surface. When the adhesive surface is pressed against a substrate such as metal, wood, glass, paper, plastic, or the like, the silicone release sheet can be pulled free to leave the adhesive coating at any location or surface desired.

If so desired the dry, non-tacky complex barrier surface on the adhesive can be printed by letterpress, gravure, off-set, or other conventional means. The printed product can be heat-activated as already described and applied to the desired surface. Upon peeling off the silicone release paper, the transferred printed decal is clearly readable and the print is protected by the adhesive layer covering its surface.

The foregoing detailed description of my invention has been made with respect to several preferred embodiments. It is to be understood that many of the specific materials and temperatures stated herein may be varied by persons skilled in the art without departing from the spirit and scope of my invention.

What is claimed is:

1. A two-layer coating activatable to adhesiveness by heat, comprising
   a base layer carried adjacent a substrate and comprising a viscid material, and
   a dry, non-tacky barrier layer carried by said base layer externally thereof and comprising a molecular complex dissociable above a temperature in the range of from about 35° C. to about 280° C., said molecular complex being selected from the group consisting of molecular complexes of phenols listed in Table I and amines listed in Table I; molecular complexes of urea and substituted and unsubstituted normal aliphatics having at least 8 carbon atoms; molecular complexes of urea and normal unbranched olefins having at least 8 carbon atoms; molecular complexes of thiourea and substituted and unsubstituted branched aliphatics having at least 8 carbon atoms; and molecular complexes of thiourea and branched olefins having at least 8 carbon atoms,
   whereby upon heating said coating above a dissociation temperature in the range of from about 35° C. to about 280° C. said base and barrier layers merge to form an adhesive coating.

2. The coating of claim 1, wherein said viscid material in the base layer comprises a pressure-sensitive adhesive.

3. The coating of claim 1, wherein said molecular complex in the barrier layer is formed by reaction of a first co-reactant in the base layer with a second co-reactant applied externally thereto.

4. The coating of claim 3, wherein one of said first co-reactant and said second co-reactant is a phenol and the other is an amine.

5. The coating of claim 4, wherein one of said first co-reactant and said second co-reactant is a phenol selected from Table I and the other is a corresponding amine selected from Table I.

6. The coating of claim 5, wherein said base layer further comprises a third co-reactant adapted to lower the dissociation temperature of said molecular complex, said third co-reactant being selected from the group consisting of benzil, hydroquinone-monomethylether, p-hydroxyacetophenone, 4-methoxybenzil, t.butylhydroquinone, 1,5-diphenylpentenedione, and dehydroacetic acid.

7. The coating of claim 5, wherein said base layer further comprises a third co-reactant adapted to lower the dissociation temperature of said molecular complex, said third co-reactant being selected from the group consisting of 1,5-diphenyl-3-pentenedione; benzophenone; 2,3,4-trihydroxydecaphenone; 4,4'-dimethylbenzophenone; dehydroacetic acid; benzil; 4-methoxybenzil; ethyl-p-hydroxybenzoate; resorcinol monobenzoate; and p-bromoacetophenone.

8. The coating of claim 3, wherein one of said first co-reactant and said second co-reactant is a compound selected from the group consisting of substituted and unsubstituted normal aliphatics having at least 8 carbon atoms, and the other is urea.

9. The coating of claim 8, wherein said base layer further comprises a third co-reactant adapted to lower the dissociation temperature of said molecular complex, said third co-reactant being selected from the group consisting of dehydroacetic acid and glycollic acid.

10. The coating of claim 3, wherein one of said first co-reactant and said second co-reactant is a normal unbranched olefin having at least 8 carbon atoms, and the other is urea.

11. The coating of claim 3, wherein one of said first co-reactant and said second co-reactant is a compound selected from the group consisting of substituted and unsubstituted branched aliphatics having at least 8 carbon atoms, and the other is thiourea.

12. The coating of claim 3, wherein one of said first co-reactant and said second co-reactant is a branched olefin having at least 8 carbon atoms, and the other is thiourea.

13. The coating of claim 3, wherein one of said first co-reactant and said second co-reactant is 4,4'-isopropylidenebis (6-t.butyl-m-cresol) and the other is a compound selected from the group consisting of dibenzylamine, hexamethyleneamine, benzyldimethylamine, and triisopropanolamine.

14. The coating of claim 3, wherein one of said first co-reactant and said second co-reactant is compound selected from the group consisting of hydroquinone and pyrogallol and the other is hexamethyleneamine.

15. The coating of claim 3, wherein one of said first co-reactant and said second co-reactant is a compound selected from the group consisting of fatty amines having at least 8 carbon atoms, lauric acid, fatty acid amines having at least 8 carbon atoms, octanoic acid, oleic acid, dehydrogenated tallow amine, oleonitrile, and n-octyl-n-decyladipate, and the other is urea.

16. The coating of claim 3, wherein one of said first co-reactant and said second co-reactant is 4,4'butylidenebis (6-tert-butyl-m-cresol), and the other is a compound selected from the group consisting of N-phenylbenzylamine, hexamethylene amine, N-phenylmorpholine, N-phenylnaphthylamine, tribenzylamine, benzyldimethylamine, phenyldiethanolamine, and the triisopropanolamine.

17. The coating of claim 3, wherein one of said first co-reactant and said second co-reactant is 2,2'-methylenebis (3,4,6-trichlorophenol) and the other is benzyldimethylamine.

* * * * *